March 9, 1943.    K. O. NELSON    2,313,257
VALVE
Filed May 5, 1941    2 Sheets-Sheet 1

INVENTOR
KARL O. NELSON
BY Louis O. French
ATTORNEY

March 9, 1943.   K. O. NELSON   2,313,257
VALVE
Filed May 5, 1941   2 Sheets-Sheet 2

INVENTOR
KARL O. NELSON
BY Louis O. French
ATTORNEY

Patented Mar. 9, 1943

2,313,257

UNITED STATES PATENT OFFICE 2,313,257

VALVE

Karl O. Nelson, Milwaukee, Wis., assignor of one-half to Henry J. Nunnemacher, Milwaukee, Wis.

Application May 5, 1941, Serial No. 391,915

1 Claim. (Cl. 251—98)

The invention relates to multi-port valves.

The general object of the invention is to provide a balanced and shockproof multi-port valve. More particularly, I have provided what may be termed a rotary piston valve wherein the ports of the valve are so arranged as to balance the action of the pressure fluid upon the valve in all directions and wherein the clearance between the valve and its casing is so small that the valve will not be injured by shock that may be occasioned on the opening of the valve under high pressures. The valve is further arranged so that the heads of its casing are relieved of any possible high pressure strains that might otherwise develop.

The invention further consists in the several features hereinafter described and more particularly set forth in the claim at the conclusion hereof.

Figure 1:
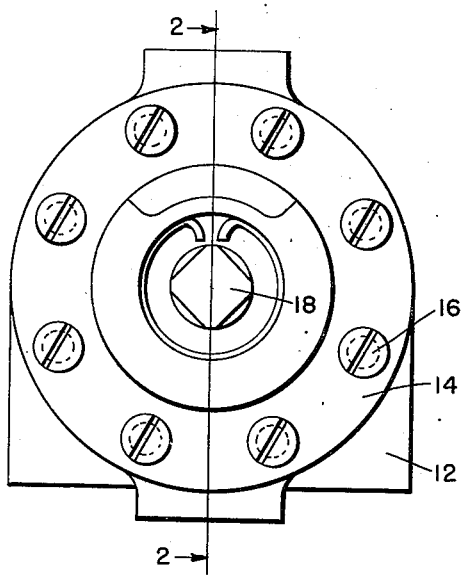
Fig. 1 is a plan view of a valve embodying the invention.
Figure 2:
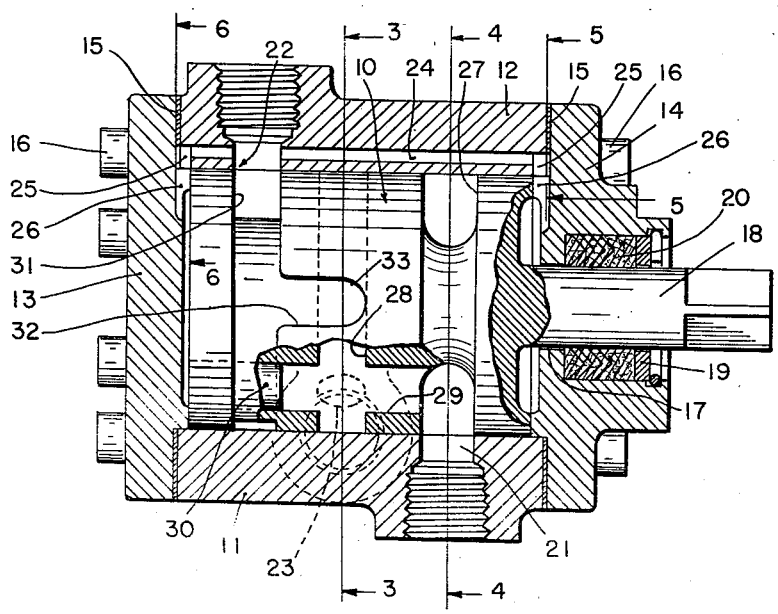
Fig. 2 is a vertical sectional view taken on the line 2—2 of Fig. 1.

Referring to the drawings, the valve includes a valve member 10 formed as a straight cylindrical piston mounted to rotate in a casing 11 formed of a cylindrical body 12 and end caps 13 and 14 each secured in fluid-tight relation with the body by a gasket 15 and screws 16. The cap 14 has a centrally disposed bore 17 through which the stem or operating projection 18 of the valve projects and which is sealed against any leakage due to seepage along the stem by a stuffing box 19 including the packing 20. The exposed end of the stem 18 is squared for receiving an operating means (not shown) such as a handle, gear, or any other suitable manual or power actuator that may be used to turn the valve.

The valve body 12 has an inlet port 21, an exhaust port 22 and one or more ports 23 connecting with the apparatus to be controlled, each of these ports being at a different level of the body 12. The body 12 also has a longitudinally extending bleed passage 24 drilled or otherwise formed therein intersecting the port 22 and connected at its ends by short cross ports or grooves 25 with short grooves 26 formed in the end caps 13 and 14, respectively.

The valve member 10 has an annular groove 27 formed therein positioned for continuous registry with the inlet port 21 in any position of the valve. This groove acts to equalize the pressures that might be exerted by the incoming pressure fluid tending to shift said valve lengthwise in its casing, so that the valve will be balanced as respects lengthwise exerted pressures. For balancing the valve against the action of lateral pressures the port or passage 28 which communicates with the inlet and the device to be controlled extends diametrically across the valve 10 and is connected to the inlet or lengthwise pressure balancing groove 27 by a port 29 here shown as formed by part of a bore extending lengthwise from one end of the valve and whose outer end is closed off by a plug 30. Since with this construction the groove 27 balances the valve against endwise movement and the passage 28 against lateral movement due to the pressure fluid, the valve is balanced against unbalanced pressures in all directions. The clearance between the valve member 10 and bore of the casing 12 is very small, these parts being fitted to within one ten-thousandth of an inch or less, so that there is very little seepage of the pressure fluid along the valve, but such seepage as does occur is prevented from backing up against the heads of the casing by providing the bleed passages 26, 25, and 24 previously referred to. Thus the heads 13 and 14 are relieved of any high pressure loads, and the valve will not be injured by shocks which may occur in known forms of valves on the opening of the valve under high pressure.

Figure 3:
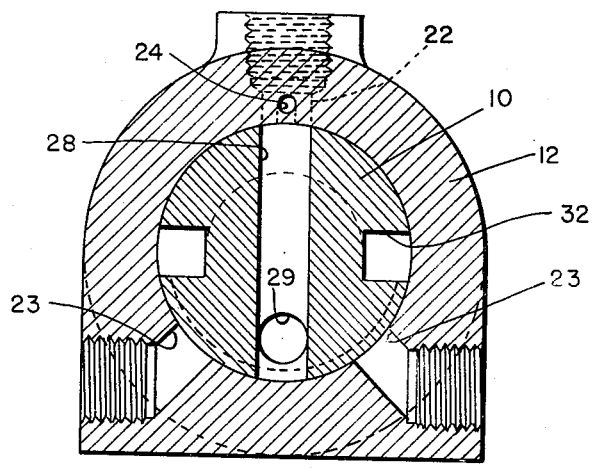
Fig. 3 is a detailed transverse sectional view taken on the line 3—3 of Fig. 2.
Figure 5:
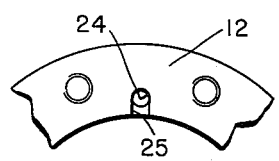
Fig. 5 is a detailed sectional view taken on the line 5—5 of Fig. 2.
Figure 4:
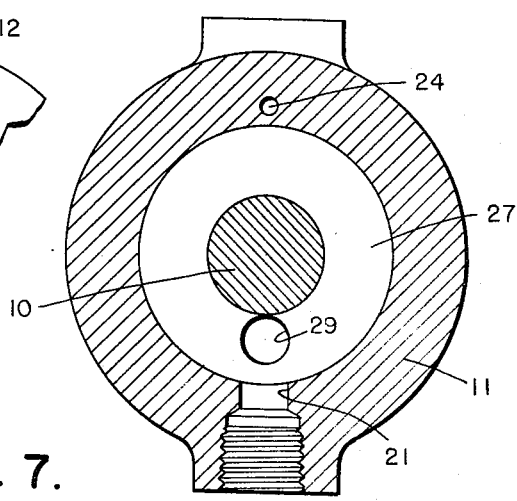
Fig. 4 is a detailed transverse sectional view taken on the line 4—4 of Fig. 2.
Figure 6:
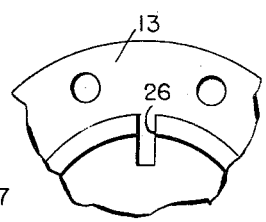
Fig. 6 is a detailed sectional view taken on the line 6—6 of Fig. 2.
Figure 7:
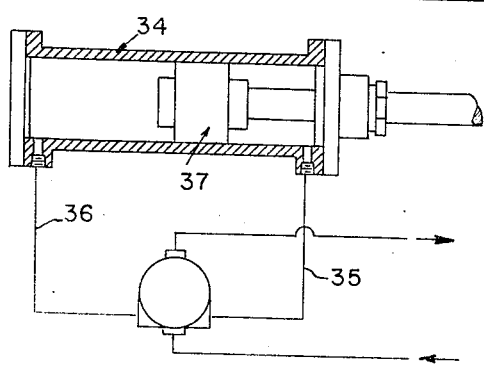
Fig. 7 is a diagrammatic view of an hydraulic circuit that may be controlled by a valve embodying the invention.

The exhaust port 22 is adapted to be brought into communication with either of the passages 23, one at a time, by a transfer groove formed in the valve 10 by a circumferentially extending groove 31 in line with the port 22 and grooves 32 communicating therewith and extending at right angles thereto so as to bring their outer ends 33 into a registering level with the ports 23. Thus with this arrangement when it is desired, for example, to control both ends of an hydraulic cylinder, such as cylinder 34 in Fig. 7, the valve 10 may be rotated so as to bring the port 23 connected by piping 35 with one end of said cylinder with the port 28, and under these conditions the part 33 of the exhaust groove will be in registry with the port 23 connected by piping 36 to the other end of the cylinder with the result that hydraulic fluid is introduced at one end of the cylinder 34 and exhausted from the other, so that the piston 37 working therein will be moved lengthwise thereof. If it is desired to stop the movement of the piston, the valve is moved to the "lapped" position shown in Fig. 3 wherein the inlet and exhaust passages on the valve member are out of registry with the cooperative ports in the casing 11.

The groove 31 preferably extends entirely around the valve, and this acts to provide an oil film for the valve which because of the very close clearances used acts as a seal during its operation.

While a four-way valve has been shown and described, it is obvious that the omission of one of the ports 23 provides a three-way valve and that the valve may be formed to take care of more than two ports to be controlled and that the invention is not to be otherwise limited except only in so far as such limitations are included in the claim.

What I claim as my invention is:

In a valve, the combination of a casing provided with a straight cylindrical bore, a cylindrical valve closely fitting said bore and having rotary movement only relative thereto, said casing having an inlet port, a port for the work to be controlled and an exhaust port, said ports in said casing being spaced lengthwise along the casing, said valve having an annular port in registry with said inlet port in any position of the valve and acting to hydraulically balance the valve against any tendency of the pressure fluid to move the valve lengthwise and having a diametrically extending port connected to said annular port and alineable with said port for the work to be controlled and acting to hydraulically balance the valve against any tendency of the pressure fluid to move the valve laterally, said ports in said valve serving to connect said inlet port with the port for the work to be controlled on the rotation of said valve to a selected position, said valve also having a port in its outer surface extending axially and lengthwise thereof to connect the port for the work to be controlled with said exhaust port.

KARL O. NELSON.